March 22, 1932. S. FREEMAN 1,850,750
ATTACHMENT FOR TOASTING DEVICES
Filed Jan. 14, 1930
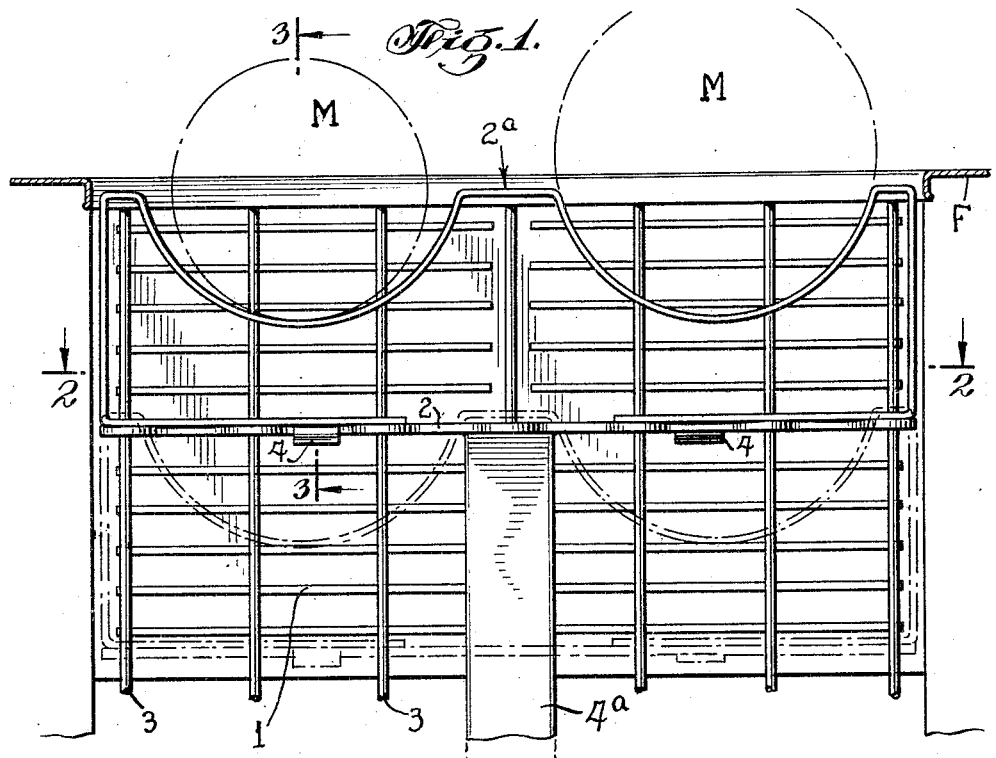
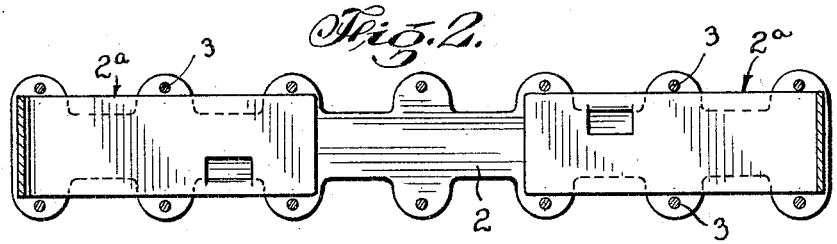
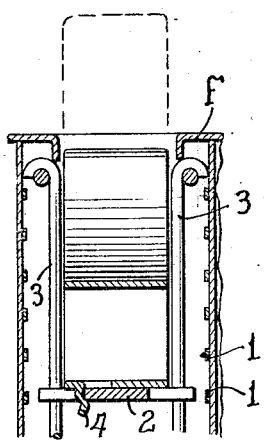
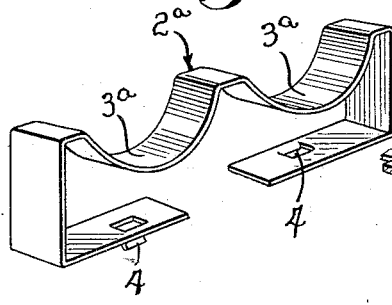
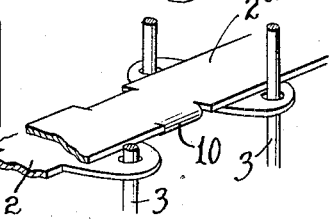
INVENTOR
Samuel Freeman
BY Mock & Blum
ATTORNEYS Patented Mar. 22, 1932

1,850,750

UNITED STATES PATENT OFFICE

SAMUEL FREEMAN, OF NEW YORK, N. Y.

ATTACHMENT FOR TOASTING DEVICES

Application filed January 14, 1930. Serial No. 420,674.

My invention relates to a new and improved attachment for a toasting device.

One of the objects of my invention is to provide an attachment whereby a toasting device can be utilized for toasting muffins and other bread products of smaller size than the ordinary slice of bread for which the toaster is designed.

Another object of my invention is to provide an attachment to a toasting device of the type in which the toasted article is automatically or manually removed from its position between the heated toasting elements, so that toasting devices of this type can be used with muffins or other bread products having smaller dimensions than the slices of bread which the toaster is designed to handle.

Another object of my invention is to provide a simple device which can be readily applied to devices already manufactured, and which can be readily removed therefrom, whenever this is desired.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is a side elevation showing the attachment applied to a toaster of conventional form.

Fig. 2 is a sectional view on the line 2—2 of Fig. 1.

Fig. 3 is a sectional view on the line 3—3 of Fig. 1.

Fig. 4 is a perspective view of the attachment.

Fig. 5 shows a different means for connecting the attachment to the supporting plate of the toaster.

Toasting devices are well known in which the heating elements comprise horizontal wires 1 which are connected so as to form a pair of vertical grids between which a piece of bread is held to be toasted. In devices of this type a movable support 2 is provided which slides upon vertical guide wires 3. The support 2 is mounted to a member by means of which said support 2 can be moved up and down, either automatically or by hand.

Devices of this kind are provided with a top frame F above which the piece of toasted bread projects when the support 2 has been moved into the position shown in Fig. 1, if the piece of bread is of ordinary size.

However, if it is desired to toast muffins M of varying size, the tops of such muffins do not project above the frame F when the support 2 has been moved into the normal upper position shown in Fig. 1. In toasters of the automatic type, the main support 2 is automatically shifted into an upper normal position, and it is then prevented from moving above said upper normal position. It is thereupon necessary to fish the muffins out with a fork, which is extremely undesirable.

According to my invention, I provide an auxiliary support 2a which can be made of any suitable metal stamped or otherwise formed into the shape shown in Fig. 4. The top of the auxiliary support 2a is provided with recesses 3 and 3a which may be of different dimensions or which may have the same dimensions. The base of the attachment 2a is provided with tongues 4 which are struck out of the body of said base portion, and said tongues 4 may be releasably connected with the base or main support 2.

As shown in Fig. 3, the tongues 4 may have a non-rectilinear shape so that they frictionally fit within the base portion 2. Hence, the member 2a can be readily detached from the member 2 by merely pulling upon said member 2a. Since the member 2a is heated by the wires 1, I prefer that the top thereof should not project above the frame F of the toaster when the support is in the discharge position illustrated in Fig. 1. This prevents the person using the attachment from being accidentally burned.

In order to eliminate the necessity of stamping the tongues 4 from the bottom portion of the attachment, the base portion of the attachment shown in Fig. 5 may be provided with tongues 10 which can be bent around the support 2. However, the tongues 10 are not too stiff to prevent the attachment 2a from being readily detached.

The tongues 4 are preferably springy, due to the kind of metal of which the attachment is formed, so that said tongues 4 form in effect detachable spring means for connecting the attachment to the main support.

I have shown a preferred embodiment of my invention, but it is clear that numerous changes and omissions can be made without departing from its spirit.

I claim:

1. An attachment for an automatic toasting device which has an outer frame and which also has an automatically movable main support slidably mounted in said frame so that said support has a lower position in said frame for holding the article which is to be toasted in toasting position, and said support has a predetermined normal upper position below the top of said frame for permitting the toasted article to be removed from said support, said attachment comprising an auxiliary support which is movable with and which is superimposed on said main support, the top of said auxiliary support being concave so that it can support a disc-like article which is smaller than the article which said toasting device is adapted to normally handle, said auxiliary support being dimensioned to hold said disc-like article well above said outer frame, when the main support is moved to its normal outer position.

2. As a new and improved article of manufacture, a toaster attachment comprising a metal frame having a base portion, said base portion being provided with spring means adapted to detachably connect said device to the bread support of a toaster.

3. As a new and improved article of manufacture, a toaster attachment comprising a metal frame having a base portion, said base portion being provided with tongue means adapted to detachably connect said device to the bread support of a toaster, said tongues being stamped out of the base portion of said device.

4. As a new and improved article of manufacture, a toaster attachment comprising a metal frame having a base portion, said base portion being provided with tongue means adapted to detachably connect said device to the bread support of a toaster, the top of said device having a concave portion.

In testimony whereof I affix my signature.

SAMUEL FREEMAN.